United States Patent
Tas et al.

(10) Patent No.: US 12,032,726 B1
(45) Date of Patent: Jul. 9, 2024

(54) METHOD TO OBFUSCATE KEYBOARD KEYS AGAINST INTERCEPTION

(71) Applicant: Deloitte Development LLC, Hermitage, TN (US)

(72) Inventors: Egemen Tas, North Bergen, NJ (US); Haibo Zhang, Beijing (CN)

(73) Assignee: Deloitte Development LLC, Hermitage, TN (US)

( * ) Notice: Subject to any disclaimer, the term of this patent is extended or adjusted under 35 U.S.C. 154(b) by 247 days.

(21) Appl. No.: 17/746,635

(22) Filed: May 17, 2022

(51) Int. Cl.
G06F 21/00 (2013.01)
G06F 9/455 (2018.01)
G06F 21/83 (2013.01)

(52) U.S. Cl.
CPC ............. *G06F 21/83* (2013.01); *G06F 9/455* (2013.01)

(58) Field of Classification Search
None
See application file for complete search history.

(56) References Cited

U.S. PATENT DOCUMENTS

| | | | |
|---|---|---|---|
| 8,707,437 B1 * | 4/2014 | Ming-Chang | G06F 21/554 726/22 |
| 8,726,148 B1 * | 5/2014 | Battilana | G06F 40/232 715/234 |
| 10,187,408 B1 * | 1/2019 | Call | G06F 21/566 |
| 11,436,330 B1 * | 9/2022 | Jennings | G06F 21/563 |
| 2005/0120242 A1 * | 6/2005 | Mayer | G06F 21/55 726/4 |
| 2006/0206937 A1 * | 9/2006 | Repasi | G06F 21/52 726/22 |
| 2007/0169191 A1 * | 7/2007 | Greene | G06F 21/83 726/22 |
| 2009/0254994 A1 * | 10/2009 | Waterson | G06F 21/554 719/321 |
| 2010/0058479 A1 * | 3/2010 | Chen | G06F 21/83 726/26 |
| 2012/0079282 A1 * | 3/2012 | Lowenstein | G06F 21/83 713/189 |

(Continued)

OTHER PUBLICATIONS

Solairaj, A. et al. Keyloggers software detection techniques. 2016 10th International Conference on Intelligent Systems and Control (ISCO). https://ieeexplore.ieee.org/stamp/stamp.jsp?tp=&arnumber=7726880 (Year: 2016).*

(Continued)

*Primary Examiner* — Jeremiah L Avery
(74) *Attorney, Agent, or Firm* — Fish & Richardson P.C.

(57) ABSTRACT

Systems and methods for obfuscating keyboard keys against interception are provided. In an example, a protected application is dynamically virtualized in user space, wherein the virtualization comprises an isolated keyboard path. Keystrokes are injected to the isolated keyboard path, wherein the injected keystrokes are associated with a respective timestamp, and user input keystrokes are obfuscated with the injected keystrokes and the obfuscated keystrokes are passed to a low level hook. The obfuscated keystrokes passed to the low level hook are separated according to tags associated with the obfuscated keystrokes to obtain the user input keystrokes. The user input keystrokes are transmitted to a target window of the protected application.

20 Claims, 4 Drawing Sheets

(56) References Cited

U.S. PATENT DOCUMENTS

| | | | | |
|---|---|---|---|---|
| 2021/0034743 | A1* | 2/2021 | Tan | G06F 21/568 |
| 2021/0215788 | A1* | 7/2021 | Hu | G01S 13/56 |
| 2021/0286899 | A1* | 9/2021 | Schroeder | H04L 63/102 |
| 2021/0342020 | A1* | 11/2021 | Jorasch | G06F 3/016 |
| 2022/0045848 | A1* | 2/2022 | Hulshof | H04L 9/3236 |

OTHER PUBLICATIONS

Nasaka, Kohei et al. A Keystroke Logger Detection Using Keyboard-Input-Related API Monitoring. 011 14th International Conference on Network-Based Information Systems. https://ieeexplore.ieee.org/stamp/stamp.jsp?tp=&arnumber=6041989 (Year: 2011).*

* cited by examiner

METHOD TO OBFUSCATE KEYBOARD KEYS AGAINST INTERCEPTION

TECHNICAL FIELD

This description is related to keyboard input protection.

BACKGROUND

A computer keyboard is a device used to input information into computer systems. This information can include private and confidential data, such as passwords. Maliciously designed programs attempt to intercept keystrokes and extract sensitive information.

SUMMARY

Provided herein is systems and methods for obfuscating keyboard keys against interception are provided. In some embodiments, a system includes at least one processor and at least one memory storing instructions thereon that, when executed by the at least one processor, cause the at least one processor to dynamically virtualize a protected application in user space, wherein the virtualization comprises an isolated keyboard path. The instructions cause the processor to inject keystrokes to the isolated keyboard path, wherein the injected keystrokes are associated with a respective timestamp, and obfuscate user input keystrokes with the injected keystrokes, wherein the obfuscated keystrokes are passed to a low level hook. The instructions also cause the processor to separate the obfuscated keystrokes passed to the low level hook according to tags associated with the obfuscated keystrokes to obtain the user input keystrokes, and transmit the user input keystrokes to a target window of the protected application.

In some embodiments, a method is provided. The method includes dynamically virtualizing, a protected application in user space, wherein the virtualization comprises an isolated keyboard path. The method includes injecting keystrokes to the isolated keyboard path, wherein the injected keystrokes are associated with a respective timestamp. The method also includes obfuscating user input keystrokes with the injected keystrokes, wherein the obfuscated keystrokes are passed to a low level hook and separating the obfuscated keystrokes passed to the low level hook according to tags associated with the obfuscated keystrokes to obtain the user input keystrokes. The method includes transmitting the user input keystrokes to a target window of the protected application.

In some embodiments, at least one non-transitory storage media is provided. The at least one non-transitory storage media stores instructions that, when executed by at least one processor, cause the at least one processor to dynamically virtualize a protected application in user space, wherein the virtualization comprises an isolated keyboard path. The instructions cause the at least one processor to inject keystrokes to the isolated keyboard path, wherein the injected keystrokes are associated with a respective timestamp, and obfuscate user input keystrokes with the injected keystrokes, wherein the obfuscated keystrokes are passed to a low level hook. The instructions also cause the at least one processor to separate the obfuscated keystrokes passed to the low level hook according to tags associated with the obfuscated keystrokes to obtain the user input keystrokes, and transmit the user input keystrokes to a target window of the protected application.

The details of one or more embodiments of the invention are set forth in the accompanying drawings and descriptions below. Other features, objects and advantages of the invention will be apparent from the description and drawings, and from the claims.

DESCRIPTION OF DRAWINGS

Like reference symbols in the various drawings indicate like elements.

DETAILED DESCRIPTION

Keystroke logging refers to recording (e.g., logging) the keys struck on a keyboard. A keylogger refers to software, hardware, or any combinations thereof, that records keystrokes. An application is a process that can instantiate (e.g., spawn) one or more sub-processes (collectively referred to as processes). The processes are executable to perform one or more functions. In examples, a process may refer to an instance of a particular executable (.exe program file) running. An application may have several processes executing simultaneously. An operating system enables execution of applications by providing resources such as packages, libraries, and application programming interfaces (APIs) that support both protected and unprotected applications. A malicious process is a file or code that infects, explores, steals, or performs other actions that compromise another application.

Traditional attempts to prevent malicious processes from logging keystrokes typically monitor keyboard APIs or intercept keys struck on a physical keyboard or on-screen keyboard in order to extract information. For example, traditional anti-keylogging techniques monitor keyboard APIs through a system-wide library injected into processes of a computer system, and then block execution of processes by the library when called by processes suspected to be malicious. In another example, traditional anti-keylogging techniques intercept keystrokes using a keyboard class filter driver, and deliver the intercepted keystrokes to a target application directly in an effort to bypass malicious processes listening or monitoring a typical keystroke path. In examples, traditional anti-keylogging techniques can implement a customized virtual keyboard, such as an on-screen keyboard or other software based keyboard, and encrypt keystrokes. The traditional anti-keylogging techniques implement a privileged kernel driver to customize keyboard functionality. However, loading privileged drivers requires administrative level access to the hardware and operating system, and may not be possible at all in certain cases. Virtual keyboards as provided by traditional anti-keylogging techniques can create a serious disruption to the end user experience.

Figure 1A:
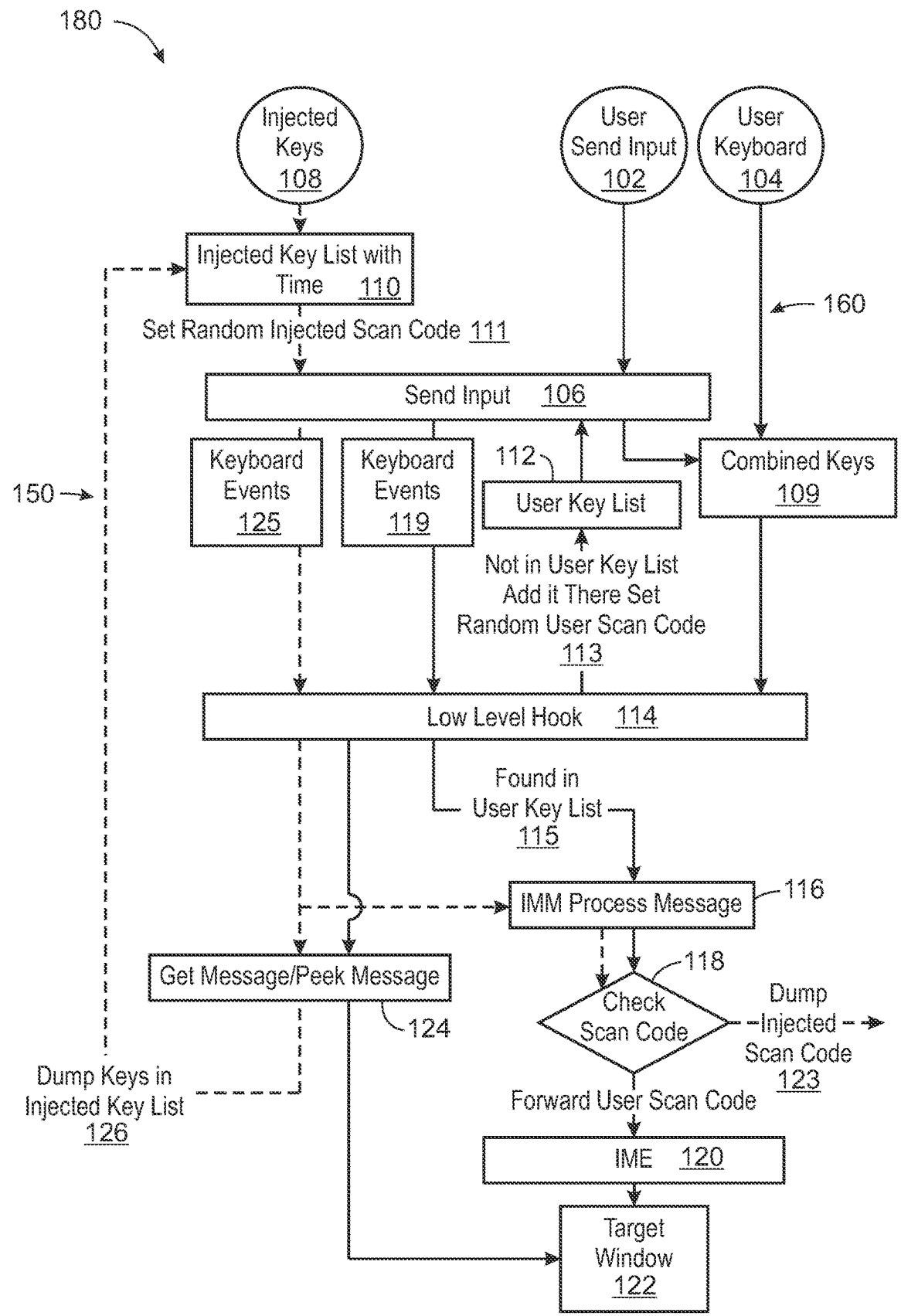
FIG. 1A is a block diagram of a keyboard obfuscation system.

The present techniques obfuscate keyboard keys against interception. In particular, the present techniques prevent keylogging by malicious processes without privileged access to the hardware and operating system, or change in the user experience. Malicious processes may be, for example, software or code designed for nefarious purposes, such as extracting private information from keys struck at a keyboard. FIG. 1A is a block diagram of a keystroke obfuscation system 180 that obfuscates keystrokes. In examples, the obfuscation is enabled via micro-containers that virtualize an application in a user space. The system described in FIG. 1A can be integrated into the system 100B of FIG. 1B, enable the process 200 of FIG. 2, and execute using the system 300 of FIG. 3.

Figure 1B:
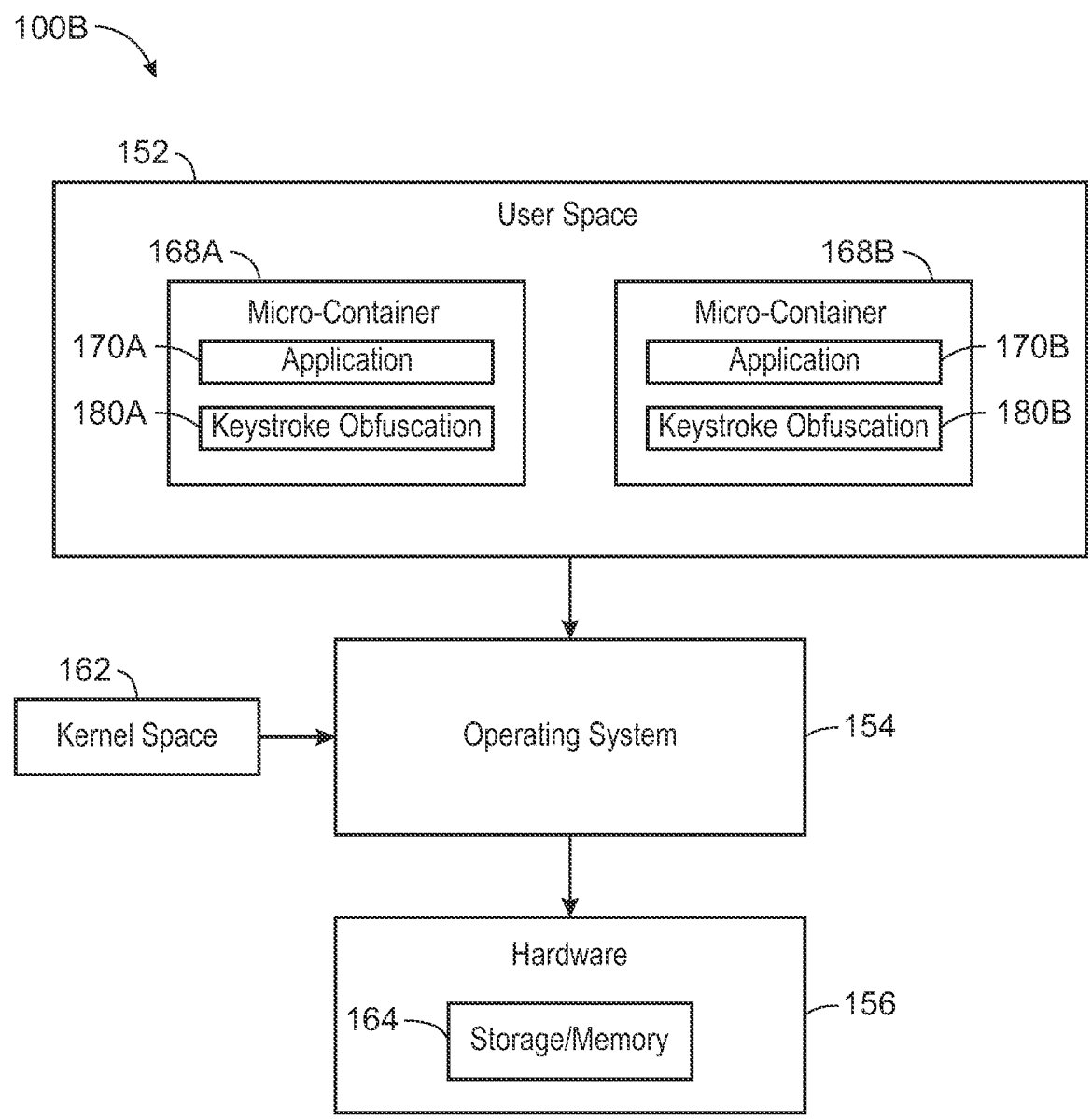
FIG. 1B is a block diagram of a system including microcontainers and that virtualize a respective protected application in a user space.

The keystroke obfuscation system 180 outputs keystrokes to a target window 122 of a protected target application. FIG. 1B is a block diagram of a system 100B including micro-containers 168A and 168B that virtualize a respective protected application in a user space 152. The system 100B may be operable according to the process 200 of FIG. 2 or the system 300 of FIG. 3. In some embodiments, the system 100B is a high level illustration that includes multiple keyboard obfuscation systems 180. For ease of description, the terms intercepting, virtualizing, or micro-containing are used interchangeably throughout. Additionally, micro-containerization can be implemented using different techniques such as user space API instrumentation or user-space binary translation and emulation.

In the example of FIG. 1B, a user space 152 is illustrated. In examples, a user space 152 is defined by an operating system 154. The operating system 154 partitions the hardware 156 into a user space 152 and a kernel space 162. This division into serves to provide memory protection and hardware protection from malicious or errant software behaviors. Generally, the kernel space 162 executes a privileged operating system kernel, kernel extensions, and device drivers. An operating system kernel executes from a protected area of memory. The protected area of memory is an area of memory with privileged writes, which prevents the kernel from being overwritten, such as by a malicious process. In embodiments, the kernel space 162 enables communication with the hardware 156. The kernel can schedule process execution via the hardware 156 and manages read and write access to storage/memory 164, including address space provided on in storage and in memory.

The user space 152 is an area of memory where application software and some device drivers execute. In embodiments, the user space 152 includes all processes that execute outside of the operating system kernel space 162. The operating system 154 manages the user space 152, where user processes are run, and will constantly interact with the kernel space 162. The present techniques enable obfuscation of keys struck at a keyboard without requiring any privileged access, such as access to the kernel space 162. The obfuscation prevents malicious processes from intercepting keystrokes. In embodiments, micro-containers 168A and 168B (e.g., collectively referred to as micro-containers 168) are instantiated within the user space 152. The micro-containers execute via user-space unprivileged virtualization to protect target applications 170A and 170B (e.g., collectively referred to as target applications 170), respectively. The target applications include an area where keystrokes are rendered or represented, such as the target window 122 described with respect to FIG. 1A. In some embodiments, the keys struck by a user are delivered directly to the target application 170 without being rendered at a target window 122. In examples, a protected application is an application that is secure against malicious processes with access to a protected address space, while an unprotected application is an application that is not secure against malicious processes and does not access protected address spaces. Protected applications are dynamically virtualized in user space using micro-containerization. As shown in FIG. 1A, a micro-container enables a custom keystroke injection path as outlined in the FIG. 1A using the dashed injected keystroke path 150. The solid user keystroke path 160 represents user input keystrokes. In examples, when a protected application accepts keyboard input, the respective micro-container generates random key strokes that are unrecognizable to processes external to the keyboard obfuscation system. The keyboard obfuscation system intercepts the user keys input at a target window and injects random keys, removes the injected keys, and transmits the keys input by the user for further processing. When using the keyboard obfuscation system, keyloggers that extract keystrokes will extract both random keys and keys input by a user, and cannot distinguish or separate the keystrokes.

Referring again to FIG. 1B, in some embodiments the micro-containers 168 are supported by virtualizing hardware 156 and access to kernel space 162 using the operating system 154. In examples, the virtualized hardware includes a virtual memory, virtual network interface, a virtual CPU, and the like. The micro-containers 168A and 168B are each self-isolated modules that include respective keystroke obfuscation systems 180A and 180B (collectively referred to as keystroke obfuscation systems 180). Generally, the micro-containers 168 encapsulate components necessary to run desired software (e.g., applications 170). These components include files, environment variables, dependencies, and libraries. The operating system 154 constrains the micro-containers' 168 access to physical resources, such as the CPU or storage/memory, so a single micro-container cannot consume all of a host's physical resources. In embodiments, the micro-container includes less components when compared to a virtual machine. A micro-container eliminates the need to launch a complete entire virtual machine for every application, and instead executes via an isolated system, single control host, and accesses a single kernel. Traditional virtual machines operate using a full copy of the operating system as well as a virtual copy of every hardware component running the OS. This consumes a large portion of compute resources, such as storage, memory, and processing resources. Micro-containers 168 are operable using less than a full virtualized operating system. In particular, a micro-container is executable using portions of an OS, such as the libraries and other system resources necessary to run a specific program. In embodiments, each micro-container is customized based on requirements of a corresponding processes to be executed. The particular resources needed for application execution are replicated in a customized micro-container. In examples, the customized micro-containers include packages, libraries, and APIs called by the application. Thus, the micro-container is customized by analyzing processes to be executed and instantiating a micro-container that includes virtualized operating system components for use by the process. In this manner, micro-containers can support a larger number of applications when compared to a virtual machine due to, at least in part, lower compute resource requirements. In embodiments, micro-containers are executed using cloud based resources, enabling edge/mobile implementation for process memory protection against foreign code injection.

Referring again to FIG. 1A, the keystroke obfuscation system 180 implements user space anti-keylogging using operating system level functionality. For ease of description, the user space anti-keylogging is described with respect to a Windows operating system, however any operating system can be used. In the example of FIG. 1A, a user send input function 102 synthesizes keystrokes as entered by a user at a virtual or on-screen keyboard. An on-screen keyboard may be a keyboard rendered at a display of an electronic device, such as a display of system 300 of FIG. 3. As illustrated, keys input using the user send input function 102 are provided to a send input function 106. In examples, the send input function 106 is provided by an operating system. The send input function generates a keyboard event in response to keys struck by a user. In examples, the send input function 106 is a legitimate application that captures and delivers key strokes. The keyboard event describes a key and an interaction between the user and a key (e.g., a type of event such as key down, key press, or key up). Users can also input keystrokes at a physical user keyboard 104. Keystrokes entered at a physical user keyboard 104 are provided directly to a low-level hook 114.

The send input function 106 converts the user input keys (e.g., keys from user send input 102 and/or physical keyboard 104) to a keyboard event. This conversion is executed so that keyloggers cannot distinguish physical keys by their source. Keystrokes at the send input function 106 are associated with a key list that includes a timestamp and key codes associated with each respective keystroke. In some embodiments, keystrokes entered at the physical user keyboard 104 are input to send input function 106 from the low level hook 114 to obfuscate all keystrokes as input by a user. In particular, the keystrokes from the physical user keyboard 104 are combined with keys synthesized by the user send input function 102, and the combined keys 109 input to low-level hook 114. As illustrated, combined keys 109 (e.g., from user send input 102 and keyboard 104) are intercepted at the low level hook 114 and converted to keyboard events via the solid user keystroke path 160 that includes reference numbers 112 and 113.

User keys from the combined keys 109 are represented in a user key list 112. The user key list 112 is to distinguish keys converted to keyboard events corresponding to the combined keys from other user keys. In examples, the other user keys are keys from the user send input 102 that have not been combined with the keystrokes entered at the physical user keyboard 104, and thus have not been converted to a keyboard event. The low level hook 114 outputs the combined keys (e.g., from user send input 102 and keyboard 104) and a random tag is provided at reference number 113. Each key from user send input 102 and keyboard 104 is associated with a random tag. As used herein, a tag is an attribute of a keystroke not used by the operating system. In some embodiments, the tags are randomly associated with a key and stored in the key list 112 along with the corresponding timestamp. In examples, the timestamp indicates a time associated with user interaction with the key. In some embodiments, the tag indicates whether a key is an injected key or a user input key by comparison with a key list. When the low level hook 114 intercepts a key input by the user, a check of the key list 112 is performed. If the input user key is not in the list, the key is a newly intercepted key from the combined keys 109. The newly intercepted key is assigned a random tag at reference number 113 and the key is added to the key list 112. The combined keys 109 then are input to the send input function 106 where they are converted into keyboard events 119. Each respective keyboard event 119 is associated with a key and tag as stored in the user key list 112.

Simultaneously with the combined keys 109, injected keys 108 are provided to the send input function 106 along the dashed keystroke path 150. The send input function 106 converts all keys to keyboard events. As illustrated, an injected key list 110 stores injected keys 108, and each injected key is associated with a timestamp. A random tag is associated with each key in the injected key list 110 at reference number 111, and the injected keys 108 are provided as input to the send input function 106. In some embodiments, the injected key list 110 is used to distinguish injected keys 108 from keys as input by the user, contained in the user key list 112. The injected keys 108 are input to the send input function 106 where they are converted into keyboard events 125, and each respective keyboard event 125 is associated with a key and tag as stored in the injected key list 110.

The keyboard events 119 and keyboard events 125 are input to the low level hook 114. At the low-level hook 114, any keylogger attempting to intercept keystrokes from the user is unable to distinguish between keystrokes input by the user (e.g., keystrokes from the user send input function 102 or keystrokes input via the physical user keyboard 104) and the injected keys (e.g., injected keys 108). Generally, the low level hook 114 functions to handle intercepted function calls, events or messages. The keyboard events 119 and keyboard events 125 are intercepted by the low level hook 114, and the low level hook 114 determines which of the intercepted keyboard events correspond to a key in the user key list 112. When found in the user key list 112, the keyboard event corresponds to a key input by the user via the user send input 102 or user keyboard 104. The low level hook 114 will forward the keyboard events found in the user key list 112 as illustrated at reference number 115, without converting the keys to events a second time. The user key list 112 is continuously updated to include both keystrokes as input at user send input function 102 and physically via physical user keyboard 104.

Malicious keyloggers attempt to "sniff" the keystrokes output by the send input function 106. In examples, malicious keyloggers access the low level hook 114 and intercept keystrokes from send input function 106. The present techniques obfuscate the keystrokes output by the send input function 106 so that keyloggers cannot detect the keystrokes. The low level hook receives keyboard events that represent injected keys 108 and any user keystrokes input at the user send input function 102 or the physical user keyboard 104. Timestamps associated with the injected keys 108, user keystrokes input at the user send input function 102, and keystrokes input via the physical user keyboard 104 are known via the key list 110 and the key list 112, respectively. Additionally, tags associated with the injected keys 108, user keystrokes input at the user send input function 102, and keystrokes input via the physical user keyboard 104 are randomly assigned. In some embodiments, the timestamps are used to differentiate between injected keys 108 and keystrokes as input by the user at user send input function 102 or the physical user keyboard 104.

Two paths are output by the low-level hook 114. The dashed injected keystroke path 150 output by the low-level hook provides keyboard events 125 as input to a GetMessage/PeekMessage function 124. The solid user keystroke path 160 provides keyboard events 119 as input to an IMMProcessMessage function 116. The IMMProcessMessage function 116 can translate keys to a customized input language (e.g., Chinese, Japanese, etc.) before delivering the keys to a target window's GetMessage/PeekMessage function 124. From the IMMProcessMessage function 116, the tags assigned to keys of the associated keyboard events are checked at block 118. At block 118, a comparison of the tags in the injected key list 110 or the user key list 112 is used to determine if a tag corresponds to an injected key. If the tag corresponds to an injected key as found in the injected key list 110, the corresponding keyboard event is dumped or discarded at block 123. If the tag corresponds to a user key as found in the user key list 112, the corresponding keyboard event are forwarded as illustrated at reference number 121. An input method editor (IME) 120 receives the keyboard event. The IME enables a user to input text in a language that cannot be represented easily on a standard QWERTY keyboard. From the IME 120, the keyboard event representing user keystrokes from user send input function 102 or the physical user keyboard 104 is rendered at the target window 122. The target window 122 is the target location for keys entered by the user. For example, the target location is a rendered location within the protected application where keystrokes are displayed. The keystrokes may be displayed at a password entry box, the word processing application, or any other location for keystroke entry.

On the dashed injected keystroke path 150, at the GetMessage/PeekMessage function 124, a message queue for a message that matches the filter criteria is checked and then the message is copied to an MSG structure. In examples, windows (e.g., target window 122) that accept user input are operable via a GetMessage/PeekMessage APIs that receives keyboard events. In some embodiments, keyboard events sent to these APIs are intercepted and filtered to ensure that the GetMessage/PeekMessage function does not deliver the injected keys to a graphical user interface (GUI) of the target window 122. The filtered keys are dumped from the injected key list 110 at reference number 126. Accordingly, a keylogger that executes at the low-level hook 114 is unable to understand the difference between injected keys and real keystrokes as input by the user via a virtualized keyboard using user send input function 102 or the physical user keyboard 104.

The block diagram of FIG. 1A is not intended to indicate that the keystroke obfuscation system 180 is to include all of the components shown in FIG. 1A. Rather, the keystroke obfuscation system 180 can include fewer or additional components not illustrated in FIG. 1A (e.g., keystroke paths, functions, etc.). Similarly, the block diagram of FIG. 1B is not intended to indicate that the system 100B is to include all of the components shown in FIG. 1B. Rather, the system 100 can include fewer or additional components not illustrated in FIG. 1B (e.g., micro-containers, applications, keyboard obfuscation systems, etc.) The keystroke obfuscation system 180 and the system 100B may include any number of additional components not shown, depending on the details of the specific implementation. Furthermore, any of the functionalities may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2:
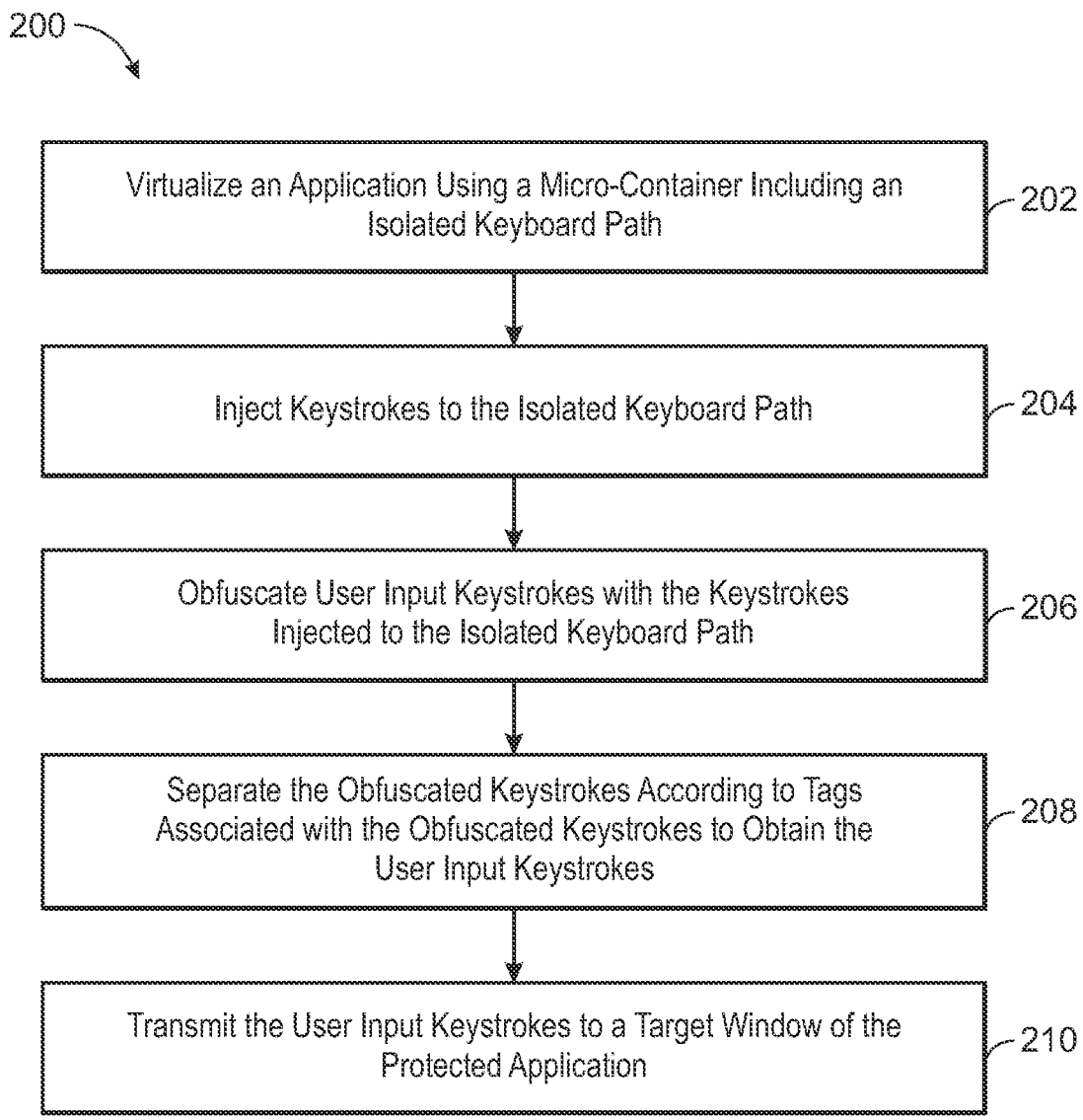
FIG. 2 is a block diagram of a process that obfuscates keyboard keys against interception.

FIG. 2 is a process flow diagram of a process 200 that obfuscates keyboard keys against interception. The process 200 of FIG. 2 may be implemented by the keyboard obfuscation system 180 of FIG. 1A, can execute via the system 100B and/or the system 300 of FIG. 3. A process 200 according to the present techniques includes a system where there are at least two types of applications, such as protected applications and unprotected applications. The non-keyboard generated keys are injected into a keystroke path of a protected application. The keyboard generated keys are separated from the non-keyboard generated keys and delivered them to the protected application. In embodiments, the present techniques are further implemented without any privileged kernel drivers installed, and without injecting a user space library into unprotected applications.

In the example of FIG. 2, at block 202, an application is virtualized by generating a custom micro-container to support execution of the application. Generally, the micro-container includes an isolated keyboard obfuscation system, such as the keyboard obfuscation systems 180 described with respect to FIGS. 1A and 1B. A micro-container isolates and packages an application (e.g., one or more processes) for execution. The micro-container is customized to provide virtualized resources such as packages, libraries, and APIs corresponding to the application. Additionally, the micro-container is generated dynamically, and on-demand, as needed for execution of a corresponding application. In embodiments, micro-containers consume considerably less hardware resources when compared to virtualization via a full virtual machine, making micro-containers ideal for running multiple instances of a single application, service, or web server. In embodiments, micro-containers function similar to virtual machines but without a hypervisor, resulting in faster resource provisioning and speedier availability of applications. Micro-containers can share access to an operating system kernel without the instantiation of a virtual machine. In some embodiments, micro-containerization is implemented using user space API instrumentation or user-space binary translation and emulation. For example, in a Windows operating system, applications call NtCreateFile (filepath, . . . ) API to open a file. The call is intercepted for contained applications, and the filepath is modified to redirect the call to an isolated area. In an exemplary Linux system, open/create can be intercepted to redirect files. For network access, in examples a socket API such as connect( ) is intercepted and network traffic is redirected to a predetermined, contained virtual network. For memory protection, a memory allocation API, such as NtAllocateVirtualMemory, NtFreeVirtualMemory, etc., is intercepted and redirected.

At block 204, keystrokes are injected to the isolated, independent, keystroke path. In embodiments, upon initialization of an application, the keystrokes are injected as described with respect to FIGS. 1A and 1B. At block 206, the user input keystrokes are obfuscated with the keystrokes injected to the isolated keystroke path, wherein the obfuscated keystrokes are passed to a low level hook. Obfuscation may occur, for example, at a send input API (e.g., send input function 106 of FIG. 1A). The obfuscation includes all keys, including injected keys (e.g., keys 108), keys entered via rendered keyboards (e.g., user send input function 102), and keys entered via a user keyboard (e.g., physical user keyboard 104). The obfuscated keystrokes passed to the low level hook (e.g., low level hook 114) according to tags associated with the obfuscated keystrokes to obtain the user input keystrokes. In some embodiments, the obfuscated keystrokes are converted to keyboard events prior to being input to the low level hook 114.

At block 208, the obfuscated keystrokes passed to the low level hook are separated according to tags associated with the obfuscated keystrokes to obtain the user input keystrokes. In some examples, tag matching is used to separate the keystrokes. At block 210, the user input keystrokes are transmitted to a target window of the protected application.

The process flow diagram of FIG. 2 is not intended to indicate that the process 200 is to include all of the steps shown in FIG. 2. Rather, the process 200 can include fewer or additional components not illustrated in FIG. 2 (e.g., additional micro-containers, applications, processes, etc.). The process 200 of FIG. 2 may include any number of additional components not shown, depending on the details of the specific implementation.

Figure 3:
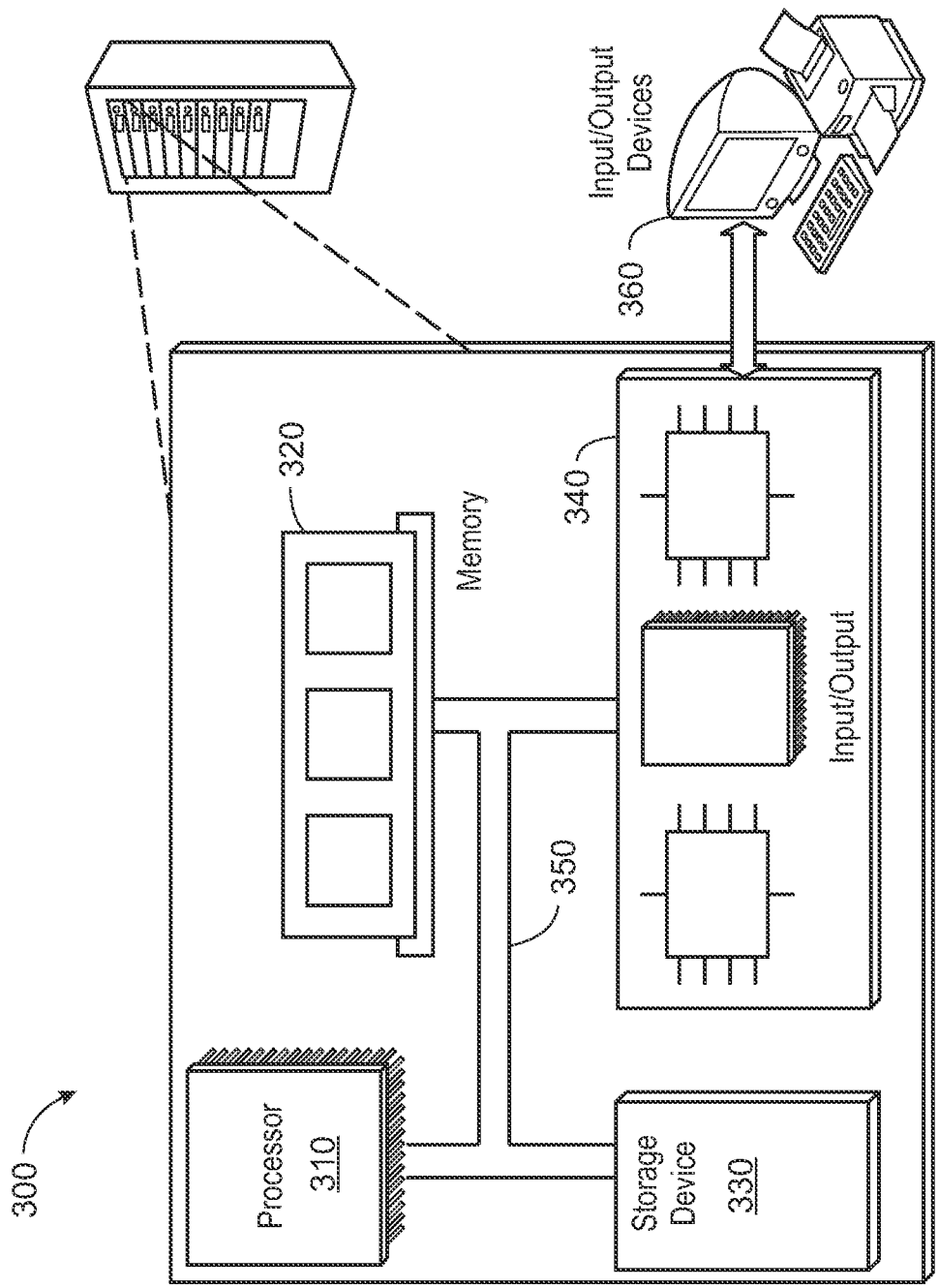
FIG. 3 is a block diagram of an example computer system that enables a method to obfuscate keyboard keys against interception.

FIG. 3 is a block diagram of an example computer system 300 that enables a method to obfuscate keyboard keys against interception. In examples, the system 300 includes the keyboard obfuscation system 180 of FIG. 1A and/or the system 100B of FIG. 1B. The system 300 can execute the process 200 of FIG. 2. The system 300 includes a processor 310, a memory 320, a storage device 330, and one or more input/output interface devices 340. Each of the components 310, 320, 330, and 340 can be interconnected, for example, using a system bus 350.

The processor 310 is capable of processing instructions for execution within the system 300. The term "execution" as used here refers to a technique in which program code causes a processor to carry out one or more processor instructions. The processor 310 is capable of processing instructions stored in the memory 320 or on the storage device 330. The processor 310 may execute operations such as process memory protection against foreign code injection.

The memory 320 stores information within the system 300. In some implementations, the memory 320 is a computer-readable medium. In some implementations, the memory 320 is a volatile memory unit. In some implementations, the memory 320 is a non-volatile memory unit.

The storage device 330 is capable of providing mass storage for the system 300. In some implementations, the storage device 330 is a non-transitory computer-readable medium. In various different implementations, the storage device 330 can include, for example, a hard disk device, an optical disk device, a solid-state drive, a flash drive, magnetic tape, or some other large capacity storage device. In some implementations, the storage device 330 may be a cloud storage device, e.g., a logical storage device including one or more physical storage devices distributed on a network and accessed using a network. The input/output interface devices 340 provide input/output operations for the system 300. In some implementations, the input/output interface devices 340 can include one or more of a network interface devices, e.g., an Ethernet interface, a serial communication device, e.g., an RS-232 interface, and/or a wireless interface device, e.g., an 802.11 interface, a 3G wireless modem, a 5G wireless modem, a 7G wireless modem, etc. A network interface device allows the system 300 to communicate, for example, transmit and receive such data. In some implementations, the input/output device can include driver devices configured to receive input data and send output data to other input/output devices, e.g., keyboard, printer and display devices 360. In some implementations, mobile computing devices, mobile communication devices, and other devices can be used.

A server or database system can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 300 is contained within a single integrated circuit package. A system 300 of this kind, in which both a processor 310 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 340.

Although an example processing system has been described in FIG. 3, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM, DVD-ROM, and Blu-Ray disks. The processor and the memory can be supplemented by, or incorporated in, special purpose logic circuitry. Sometimes a server is a general purpose computer, and sometimes it is a custom-tailored special purpose electronic device, and sometimes it is a combination of these things. Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. For example, the functionality described herein may be realized through an application or "app." The app may be located on the device as described herein. The app may also be located on a second device communicatively coupled with a device as described herein. The components of the system can be interconnected by any form or medium of digital data communication, e.g., a communication network. Examples of communication networks include a local area network ("LAN") and a wide area network ("WAN"), e.g., the Internet. The components of the system may also communicate via short range wireless communication standard, such as Bluetooth.

A number of embodiments of the invention have been described. Nevertheless, it will be understood that various modifications may be made without departing from the spirit and scope of the invention.

What is claimed is:

1. A system, comprising:
at least one processor; and
at least one memory storing instructions thereon that, when executed by the at least one processor, cause the at least one processor to:
dynamically virtualize a protected application in user space, wherein the virtualization comprises an isolated keyboard path;
inject keystrokes to the isolated keyboard path, wherein the injected keystrokes are associated with a respective timestamp;
obfuscate user input keystrokes with the injected keystrokes, wherein the obfuscated keystrokes are passed to a low level hook;
separate the obfuscated keystrokes passed to the low level hook according to tags associated with the obfuscated keystrokes to obtain the user input keystrokes; and
transmit the user input keystrokes to a target window of the protected application.

2. The system of claim 1, wherein the protected application is dynamically virtualized without privileged kernel drivers.

3. The system of claim 1, wherein the protected application is dynamically virtualized by generating a custom micro-container to support execution of the application.

4. The system of claim 1, wherein the instructions cause the at least one processor to:
convert user input keystrokes and injected keystrokes to keyboard events;
obfuscate the keyboard events; and
transmit the keyboard events to the low level hook.

5. The system of claim 1, wherein the instructions cause the at least one processor to compare the tags to a user key list, and extract keys that correspond to tags found in the user key list to separate the obfuscated keystrokes.

6. The system of claim 1, wherein virtualization is achieved using micro-containers implemented through user space application programming interface implementation.

7. The system of claim 1, wherein virtualization is achieved using micro-containers implemented through user space binary translation and emulation.

8. A method, comprising:
dynamically virtualizing, using at least one processor, a protected application in user space, wherein the virtualization comprises an isolated keyboard path;
injecting, using the at least one processor, keystrokes to the isolated keyboard path, wherein the injected keystrokes are associated with a respective timestamp;
obfuscating, using the at least one processor, user input keystrokes with the injected keystrokes, wherein the obfuscated keystrokes are passed to a low level hook;
separating, using the at least one processor, the obfuscated keystrokes passed to the low level hook according to tags associated with the obfuscated keystrokes to obtain the user input keystrokes; and
transmitting, using the at least one processor, the user input keystrokes to a target window of the protected application.

9. The method of claim 8, wherein the protected application is dynamically virtualized without privileged kernel drivers.

10. The method of claim 8, wherein the protected application is dynamically virtualized by generating a custom micro-container to support execution of the application.

11. The method of claim 8, comprising:
converting user input keystrokes and injected keystrokes to keyboard events;
obfuscating the keyboard events; and
transmitting the keyboard events to the low level hook.

12. The method of claim 8, wherein the instructions cause the at least one processor to compare the tags to a user key list, and extract keys that correspond to tags found in the user key list to separate the obfuscated keystrokes.

13. The method of claim 8, wherein virtualization is achieved using micro-containers implemented through user space application programming interface implementation.

14. The method of claim 8, wherein virtualization is achieved using micro-containers implemented through user space binary translation and emulation.

15. At least one non-transitory storage media storing instructions that, when executed by at least one processor, cause the at least one processor to:
dynamically virtualize a protected application in user space, wherein the virtualization comprises an isolated keyboard path;
inject keystrokes to the isolated keyboard path, wherein the injected keystrokes are associated with a respective timestamp;
obfuscate user input keystrokes with the injected keystrokes, wherein the obfuscated keystrokes are passed to a low level hook;
separate the obfuscated keystrokes passed to the low level hook according to tags associated with the obfuscated keystrokes to obtain the user input keystrokes; and
transmit the user input keystrokes to a target window of the protected application.

16. The non-transitory storage media of claim 15, wherein the protected application is dynamically virtualized without privileged kernel drivers.

17. The non-transitory storage media of claim 15, wherein the protected application is dynamically virtualized by generating a custom micro-container to support execution of the application.

18. The non-transitory storage media of claim 15, comprising:
converting user input keystrokes and injected keystrokes to keyboard events;
obfuscating the keyboard events; and
transmitting the keyboard events to the low level hook.

19. The non-transitory storage media of claim 15, wherein the instructions cause the at least one processor to compare the tags to a user key list, and extract keys that correspond to tags found in the user key list to separate the obfuscated keystrokes.

20. The non-transitory storage media of claim 15, wherein virtualization is achieved using micro-containers implemented through user space application programming interface implementation.

* * * * *